(12) United States Patent
Kumar et al.

(10) Patent No.: US 8,569,966 B2
(45) Date of Patent: Oct. 29, 2013

(54) STARTING CIRCUIT FOR BUCK CONVERTER

(75) Inventors: Nitin Kumar, Burlington, MA (US); Shashank Bakre, Woburn, MA (US); Markus Ziegler, San Pedro Garza Garcia (MX)

(73) Assignee: OSRAM SYLVANIA Inc., Danvers, MA (US)

( * ) Notice: Subject to any disclaimer, the term of this patent is extended or adjusted under 35 U.S.C. 154(b) by 148 days.

(21) Appl. No.: 13/302,075

(22) Filed: Nov. 22, 2011

(65) Prior Publication Data

US 2013/0127355 A1   May 23, 2013

(51) Int. Cl.
*H05B 37/02*   (2006.01)
*H05B 41/36*   (2006.01)

(52) U.S. Cl.
USPC ........ 315/246; 315/247; 315/200 R; 315/224; 315/291; 315/307

(58) Field of Classification Search
USPC ............ 315/246, 247, 200 R, 224, 291, 307, 315/209 R, 312, 272
See application file for complete search history.

(56) References Cited

U.S. PATENT DOCUMENTS

| | | | | |
|---|---|---|---|---|
| 6,023,037 A * | 2/2000 | Church et al. | ........... | 219/121.39 |
| 6,177,645 B1 * | 1/2001 | Church et al. | ........... | 219/121.39 |
| 7,323,827 B2 * | 1/2008 | Nerone | ......................... | 315/247 |
| 7,378,806 B2 * | 5/2008 | Nerone | ......................... | 315/291 |
| 8,274,239 B2 * | 9/2012 | Felty | ............................. | 315/247 |
| 2003/0062849 A1 * | 4/2003 | Prasad et al. | ................... | 315/224 |
| 2006/0097665 A1 * | 5/2006 | Haruna et al. | ................ | 315/308 |
| 2011/0304279 A1 * | 12/2011 | Felty | ............................. | 315/307 |
| 2012/0043899 A1 * | 2/2012 | Veskovic | .................. | 315/200 R |

* cited by examiner

*Primary Examiner* — Daniel D Chang
(74) *Attorney, Agent, or Firm* — Shaun P. Montana

(57) ABSTRACT

A ballast to energize a lamp is provided. The ballast comprises a buck converter connected to an inverter via a switching component. The buck converter includes a transistor, a capacitor, a diode, and an inductor. The switching component has a predetermined breakover voltage value and is configured to provide a start up signal to the inverter when voltage at the switching component increases to the predetermined breakover voltage value. A control circuit is configured to monitor the voltage at the switching component while the voltage at the switching component increases to the predetermined breakover voltage, and is configured to generate a gate drive pulse at a gate terminal of the transistor when the voltage at the switching component reaches a predetermined voltage that is less than the breakover voltage of the switching component.

20 Claims, 5 Drawing Sheets

STARTING CIRCUIT FOR BUCK CONVERTER

TECHNICAL FIELD

The present invention relates to lighting, and more specifically, to electronic ballasts that operate one or more lamps.

BACKGROUND

A ballast converts alternating current (AC) power from an AC power supply so that it is suitable for energizing a lamp connected to the ballast. A ballast may include a rectifier for generating a direct current (DC) signal from the AC power received from the AC power supply, a buck converter for stepping down the DC signal generated by the rectifier, and an inverter for converting the stepped down DC signal to an oscillating voltage for providing to the lamp.

SUMMARY

There is generally a lag time between the time the ballast first receives power from the AC power supply and the time that the inverter begins oscillating and thereby igniting and powering (i.e., energizing) the lamp. During this lag time, the inverter does not function as a load to the buck converter and the voltage generated by the buck converter falls. As a result, a threshold voltage for starting the inverter may never be generated, and thus the ballast would fail to ignite and power the lamp. Accordingly, there is a need for ballast that ensures a reliable start up for the lamp.

Embodiments of the present invention provide a ballast that reliably energizes a lamp connected to the ballast. In one embodiment, the ballast includes a buck converter for generating a direct current (DC) buck voltage signal having a particular peak DC buck voltage value. An inverter is connected to buck converter circuit for receiving a start up signal and, in response to receiving the start up signal, generating an oscillating voltage signal for energizing the lamp. A switching component, such as a diode for alternating current (DIAC), is connected between the buck converter and the inverter for providing the start up signal to the inverter. The switching component has a predetermined breakover voltage value. When the voltage at the switching component increases to the predetermined breakover voltage value, the switching component is configured to conduct a start up signal to the inverter. The ballast operates in a startup mode during a time period that begins when the ballast initially receives power and ends at the time that the voltage at the switching component reaches the predetermined breakover voltage.

During the start up mode, the sensing circuit senses the voltage at the switching component. A control circuit is connected to the buck converter and the sensing circuit for driving the buck converter. The control circuit is configured to monitor the sensed voltage from the sensing circuit while the voltage at the switching component increases to the predetermined breakover voltage. When the sensed voltage reaches a predetermined voltage that is less than the breakover voltage of the switching component, the control circuit is configured to drive to buck converter to generate a voltage pulse having the particular peak DC buck voltage value. Since the DC buck voltage signal drops during the startup mode, at a point in time during the start up mode aspects of the invention pump the DC buck voltage signal back to its peak value so that the voltage at the switching component will reach the predetermined breakover voltage and the inverter will be activated.

In an embodiment, there is provided a ballast. The ballast includes: a rectifier that receives an alternating current (AC) voltage signal from an AC power supply and produces a rectified voltage signal therefrom; a power factor correction circuit connected to the rectifier to provide a corrected voltage signal as a function of the rectified voltage signal; a buck converter connected to the power factor correction circuit to step down the corrected voltage signal, the buck converter comprising: an input terminal connected to the power factor correction circuit to receive the corrected voltage signal; an output terminal to provide the stepped down voltage signal; a transistor having a drain terminal, a gate terminal, and a source terminal, wherein the drain terminal is connected to the input terminal; a capacitor having a first terminal connected to the output terminal and having a second terminal connected to ground potential; a diode having an anode connected to ground potential and having a cathode connected to the source terminal of the transistor; and an inductor having a first terminal connected to the source terminal of the transistor and to the cathode of the diode, and having a second terminal connected to the first terminal of the capacitor; an inverter connected to the output terminal of the buck converter circuit to receive a start up signal and, in response, to generate an oscillating voltage signal to energize the lamp; a switching component connected between the output terminal of the buck converter circuit and the inverter to provide the start up signal to the inverter, the switching component having a predetermined breakover voltage value, wherein the switching component is configured to provide the start up signal to the inverter when a voltage at the switching component increases to the predetermined breakover voltage value; a sensing circuit configured to sense the voltage at the switching component; and a control circuit connected to the buck converter and to the sensing circuit to drive the buck converter, the control circuit configured to monitor the sensed voltage from the sensing circuit while the voltage at the switching component increases to the predetermined breakover voltage and to generate a gate drive pulse at the gate terminal of the transistor when the sensed voltage reaches a predetermined voltage that is less than the breakover voltage of the switching component.

In a related embodiment, the buck converter may further include a bootstrapping capacitor connected to the source terminal of the transistor, wherein the bootstrapping capacitor may be charged in response to the gate drive pulse generated at the gate terminal of the transistor when the sensed voltage reaches the predetermine voltage. In a further related embodiment, the buck converter may further include a bootstrapping resistor and a bootstrapping diode connected together in series, wherein a first terminal of the bootstrapping capacitor may be connected to the series connected bootstrapping resistor and bootstrapping diode, and a second terminal of the bootstrapping capacitor may be connected to the source terminal of the transistor. In a further related embodiment, the ballast may further include an internal power supply, and the bootstrapping diode may have an anode connected to the internal power supply and a cathode connected to the bootstrapping resistor.

In another related embodiment, the buck converter may further include: a bias resistor; and a bootstrapping capacitor; wherein the bias resistor may have a first terminal connected to the input terminal of the buck converter and a second terminal connected to a first terminal of the bootstrapping capacitor, and wherein a second terminal of the bootstrapping capacitor may be connected to the source terminal of the transistor.

In yet another related embodiment, the switching component may be a diode for alternating current (DIAC). In still another related embodiment, the predetermined breakover voltage may be about 32 Volts.

In yet still another related embodiment, the sensing circuit may include: a first sensing resistor and a second sensing resistor connected together in series; and a sensing capacitor; wherein the series connected first and second sensing resistors may be connected between the switching component and the ground potential, and wherein the sensing capacitor may be connected in parallel with the series connected first and second sensing resistors. In a further related embodiment, the first and second sensing resistor and the sensing capacitor may define a time constant, and wherein the voltage at the switching component may increase to the breakover voltage over a period of time, and the period of time may be a function of the time constant. In another further related embodiment, the second sensing resistor may have a first terminal connected to the first sensing resistor and a second terminal connected to ground potential, and wherein the control circuit may be connected to the sensing circuit at the first terminal of the second sensing resistor, and the sensed voltage may be the voltage across the second resistor.

In another embodiment, there is provided a ballast. The ballast includes: a buck converter to generate a direct current (DC) buck voltage output, the buck converter having a particular peak DC buck voltage value associated therewith; an inverter connected to buck converter circuit to receive a start up signal and, in response, to generate an oscillating voltage signal to energize a lamp; a switching component connected between the buck converter and the inverter to provide the start up signal to the inverter, the switching component having a predetermined breakover voltage value, wherein the switching component is configured to provide the start up signal to the inverter when voltage at the switching component increases to the predetermined breakover voltage value; a sensing circuit configured to sense the voltage at the switching component; and a control circuit connected to the buck converter and the sensing circuit to drive the buck converter, the control circuit configured to monitor the sensed voltage from the sensing circuit while the voltage at the switching component increases to the predetermined breakover voltage and to drive the buck converter to generate a voltage pulse having the particular peak DC buck voltage value when the sensed voltage reaches a predetermined voltage that is less than the breakover voltage of the switching component.

In a related embodiment, the buck converter may include a bootstrapping capacitor configured to charge responsive to the voltage pulse generated by the buck converter when the sensed voltage reaches the predetermined voltage. In another related embodiment, the sensing circuit may include: a first sensing resistor and a second sensing resistor connected together in series; and a sensing capacitor; wherein the series connected first and second sensing resistors may be connected between the switching component and ground potential, and wherein the sensing capacitor may be connected in parallel with the series connected first and second sensing resistors. In a further related embodiment, the first and second sensing resistor and the sensing capacitor may define a time constant, and wherein the voltage at the switching component may increase to the breakover voltage over a period of time, and the period of time may be a function of the time constant. In another further related embodiment, the second sensing resistor may have a first terminal connected to the first sensing resistor and a second terminal connected to ground potential, and wherein the control circuit may be connected to the sensing circuit at the first terminal of the second sensing resistor, and the sensed voltage may be the voltage across the second resistor.

In yet another related embodiment, the control circuit may be configured to drive the buck converter in a normal operation mode subsequent to the voltage at the switching component increasing to the predetermined breakover voltage value, wherein during the normal operation mode, the control circuit may drive the buck converter to operate at a particular duty cycle. In a further related embodiment, the particular duty cycle may correspond to a selected lighting level for the lamp. In another further related embodiment, the control circuit may be further configured to vary the particular duty cycle in order to vary a lighting level generated by the lamp.

In another embodiment, there is provided a ballast. The ballast includes: a rectifier to receive an alternating current (AC) voltage signal from an AC power supply and to produce a rectified voltage signal therefrom; a power factor correction circuit connected to the rectifier to provide a corrected voltage signal as a function of the rectified voltage signal; a buck converter to generate a direct current (DC) buck voltage output as a function of the corrected voltage signal, the buck converter having a particular peak DC buck voltage value associated therewith; an inverter connected to the buck converter to receive a start up signal and, in response, to generate an oscillating voltage signal to energize a lamp; a switching component connected between the buck converter and the inverter to provide the start up signal to the inverter, the switching component having a predetermined breakover voltage value, wherein the switching component is configured to provide the start up signal to the inverter when voltage at the switch component increases to the predetermined breakover voltage value; a sensing circuit configured to sense the voltage at the switching component; and a control circuit connected to the buck converter and the sensing circuit to drive the buck converter, the control circuit configured to monitor the sensed voltage from the sensing circuit while the voltage at the switching component increases to the predetermined breakover voltage and to drive the buck converter to generate a voltage pulse having the particular peak DC buck voltage value when the sensed voltage reaches a predetermined voltage that is less than the breakover voltage of the switching component.

In a related embodiment, the buck converter may include a bootstrapping capacitor configured to charge responsive to the voltage pulse generated by the buck converter when the sensed voltage reaches the predetermined voltage.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
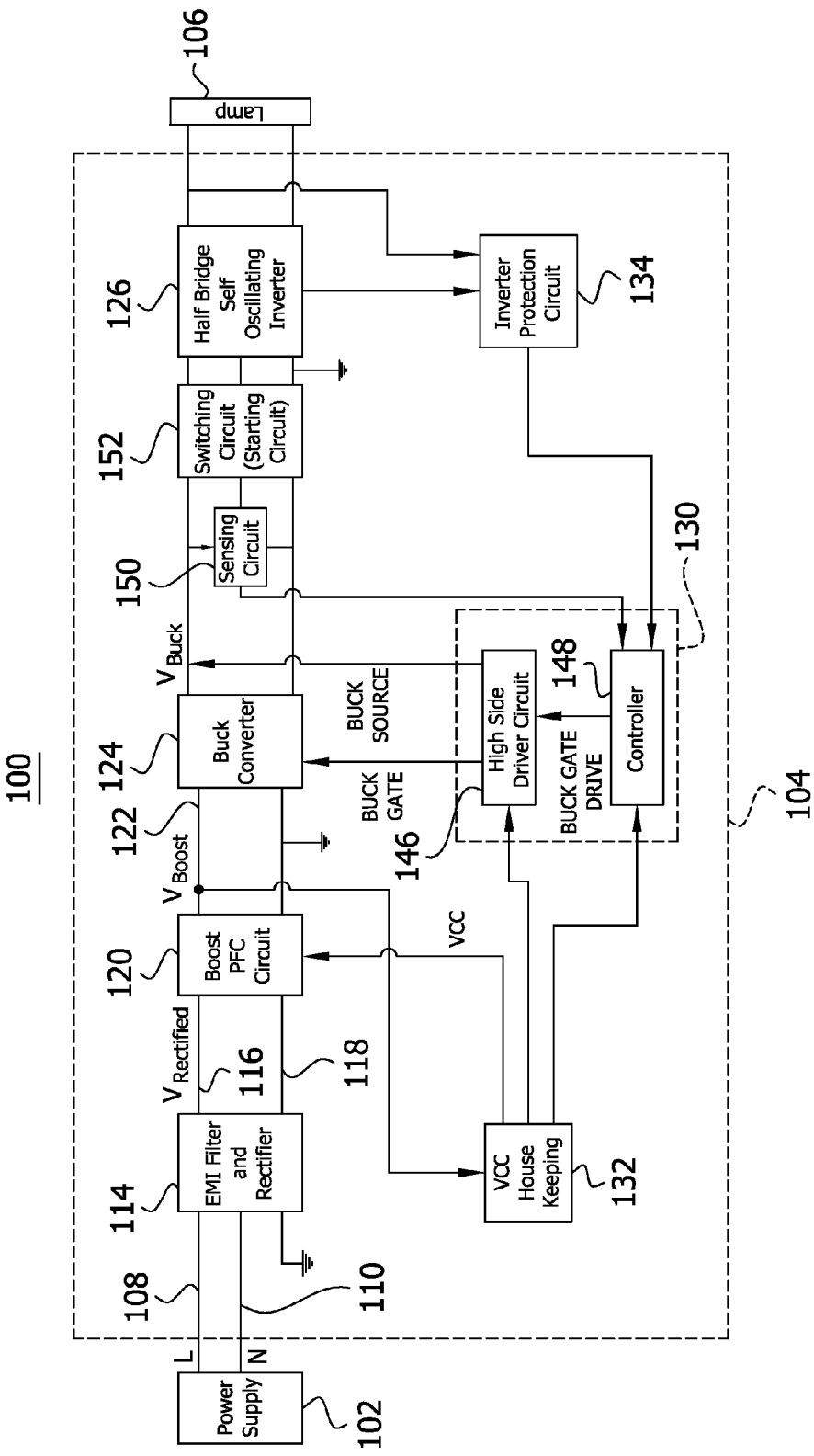
FIG. 1 is a block diagram of a lamp system according to embodiments disclosed herein.

FIG. 1 illustrates a lamp system 100 that includes an input power source, such as but not limited to an alternating current (AC) power supply 102, an electronic ballast 104 (hereinafter ballast 104), and a lamp 106. It should be noted that the lamp 106 may be a single lamp, or may be a plurality of lamps connected together in series. In some embodiments, the lamp 106 is an electrodeless lamp, such as the ICETRON® lamp available from OSRAM SYLVANIA, the QL induction lamp available from Philips, the GENURA lamp available from General Electric, or the EVERLIGHT lamp available from Matsushita. Of course, embodiments contemplate the use of other types of lamps as well.

The ballast 104 includes at least one high voltage input terminal (i.e., line voltage input terminal) 108 adapted for connecting to the alternating current (AC) power supply 102 (e.g., standard 120V AC household power), a neutral input terminal 110, and a ground terminal connectable to a ground potential (not shown in FIG. 1). An input AC power signal is received by the ballast 104 from the AC power supply 102 via the high voltage input terminal 108. The ballast 104 includes an electromagnetic interference (EMI) filter and a rectifier (e.g., full-wave rectifier) 114, which are illustrated together in FIG. 1. The EMI filter portion of the EMI filter and rectifier 114 prevents noise that may be generated by the ballast 104 from being transmitted back to the AC power supply 102. The rectifier portion of the EMI filter and rectifier 114 converts AC voltage received from the AC power supply 102 to direct current (DC) voltage. The rectifier portion includes a first output terminal connected to a DC bus 116 and a second output terminal connected to a ground potential at a ground connection point 118. Thus, the EMI filter and rectifier 114 outputs a DC voltage ($V_{Rectified}$) on the DC bus 116.

A power factor correction circuit 120, which may be, in some embodiments, a boost converter, is connected to the first and second output terminals of the EMI filter and rectifier 114. The power factor correction circuit 120 receives the rectified DC voltage ($V_{Rectified}$) and produces a high DC voltage ($V_{Boost}$) on a high DC voltage bus 122. For example, the power factor correction circuit 120 may provide a voltage of around 465 volts to the high DC voltage bus 122. A DC to DC converter, such as but not limited to a buck converter 124, is connected to the power factor correction circuit 120 via the high DC voltage bus 122. The buck converter 124 reduces the high DC voltage ($V_{Boost}$) received via the high DC voltage bus 122 and, thus, generates a stepped down DC voltage signal ($V_{Buck}$). The buck converter 124 is designed so that the DC voltage signal ($V_{Buck}$) generated thereby has a particular peak value ("peak DC buck voltage value"). An inverter circuit, such as but not limited to a half bridge self oscillating inverter 126 (hereinafter "inverter 126"), is connected to the buck converter circuit 124 for receiving the stepped down DC voltage ($V_{Buck}$) and converting it to an oscillating voltage for supplying to the lamp 106.

As detailed below, a sensing circuit 150 and a switching circuit 152 are connected between the buck converter 124 and the inverter 126. The switching circuit 152 has a first terminal connected to the buck converter 124 via the sensing circuit 150, and has a second terminal connected to the inverter 126. The sensing circuit 150 senses voltage at the first terminal of the switching circuit 152. The switching circuit 152 includes a switching component (not shown in FIG. 1), such as but not limited to a diode for alternating current (DIAC), that has a predetermined breakover voltage. The switching component operates between a non-conductive state (i.e., not conducting current) and a conductive state (conducting current). The switching component operates in the conductive state only after its breakover voltage has been reached. When the ballast 104 is powered on, the buck converter 124 begins receiving power from the power factor correction circuit 120, and the switching component operates in the non-conductive state. Accordingly, voltage builds at the first terminal of the switching circuit 152. When the voltage at the first terminal of the switching circuit 152 increases to the breakover voltage, the switching component switches from operating in the non-conductive state to operating in the conductive state and a startup signal is thereby provided to the inverter 126. In response to receiving the startup signal, the inverter 126 begins self oscillation, and produces the oscillating voltage signal that ignites and operates (i.e., energizes) the lamp 106.

Thus, the ballast 104 has three modes of operation: a start up mode, an inverter activation mode, and a normal operating mode. The ballast 104 operates in the start up mode when the ballast begins receiving power but the inverter 126 has not yet been energized. Accordingly, during the start up mode, the voltage at the first terminal of the switching circuit 152 is increasing to the breakover voltage. The ballast 104 operates in the inverter activation mode when the inverter 126 is energized. Accordingly, during the inverter activation mode, the voltage at the first terminal of the switching circuit 152 reaches the breakdown voltage, causing the switching component to breakdown and conduct a startup signal (e.g., voltage pulse) to the inverter 126 so that the inverter 126 will begin self oscillating. The ballast 104 operates in the normal operating mode when the inverter 126 self oscillates and energizes the lamp 106. Accordingly, the lamp 106 is ignited and produces light during the normal operating mode.

The lamp system 100 includes a control circuit 130 for controlling components of the lamp system 100, and a power supply (VCC) house keeping circuit 132 for powering components of the lamp system 100 including the control circuit 130. The control circuit 130 is connected to the buck converter 124 for driving the buck converter 124 during each of the three operating modes. The control circuit 130 is also connected to the sensing circuit 150. As described below, during the start up mode, the control circuit 130 monitors the voltage at the first terminal of the switching circuit 152 as sensed by the sensing circuit 152 (i.e., "sensed voltage"). When the sensed voltage increases to a predetermined voltage that is less than the breakover voltage, the control circuit 130 drives the buck converter 124 to generate a voltage pulse. The voltage pulse has the peak DC buck voltage value and ensures that the voltage at the first terminal of the sensing circuit 152 reaches the breakover voltage and that the lamp 106 is reliably started. In some embodiments, the control circuit 130 is configured to drive the buck converter 124 to generate a voltage pulse when the sensed voltage reaches a plurality of predetermined voltage values during the start up mode. During the normal operating mode, the control circuit 130 is configured to drive the buck converter 124 to generate an output voltage $V_{Buck}$ that is converted to an oscillating voltage signal and provided to the lamp 106 for energizing the lamp 106.

In FIG. 1 as shown, the lamp system 100 includes an inverter protection circuit 134 connected to the inverter 126. The inverter protection circuit 134 senses the AC voltage signal being provided to the lamp 106 and detects conditions that warrant shutting down the inverter 126. For example, the inverter protection circuit 134 detects a degas condition wherein the lamp 106 is connected to the ballast 104 but is broken, cracked, or otherwise not ignited. The inverter protection circuit 134 also detects a re-lamp condition wherein the lamp 106 is not present or because wires used to connect the lamp 106 to the ballast 104 have become disconnected during normal operation. If the inverter protection circuit 134 detects a degas condition or a re-lamp condition, the inverter protection circuit 134 indicates the presence of the condition to the control circuit 130 via an input signal. In response to receiving an indication of either the degas condition or the re-lamp condition from the inverter protection circuit 134, the control circuit 130 shuts down the power factor correction circuit 120, the buck converter 124, and the inverter 126 via an output signal. Of course, the inverter protection circuit 134 may detect other error condition(s) and inform the control circuit 130 via signal of such other error condition(s).

Figure 2:
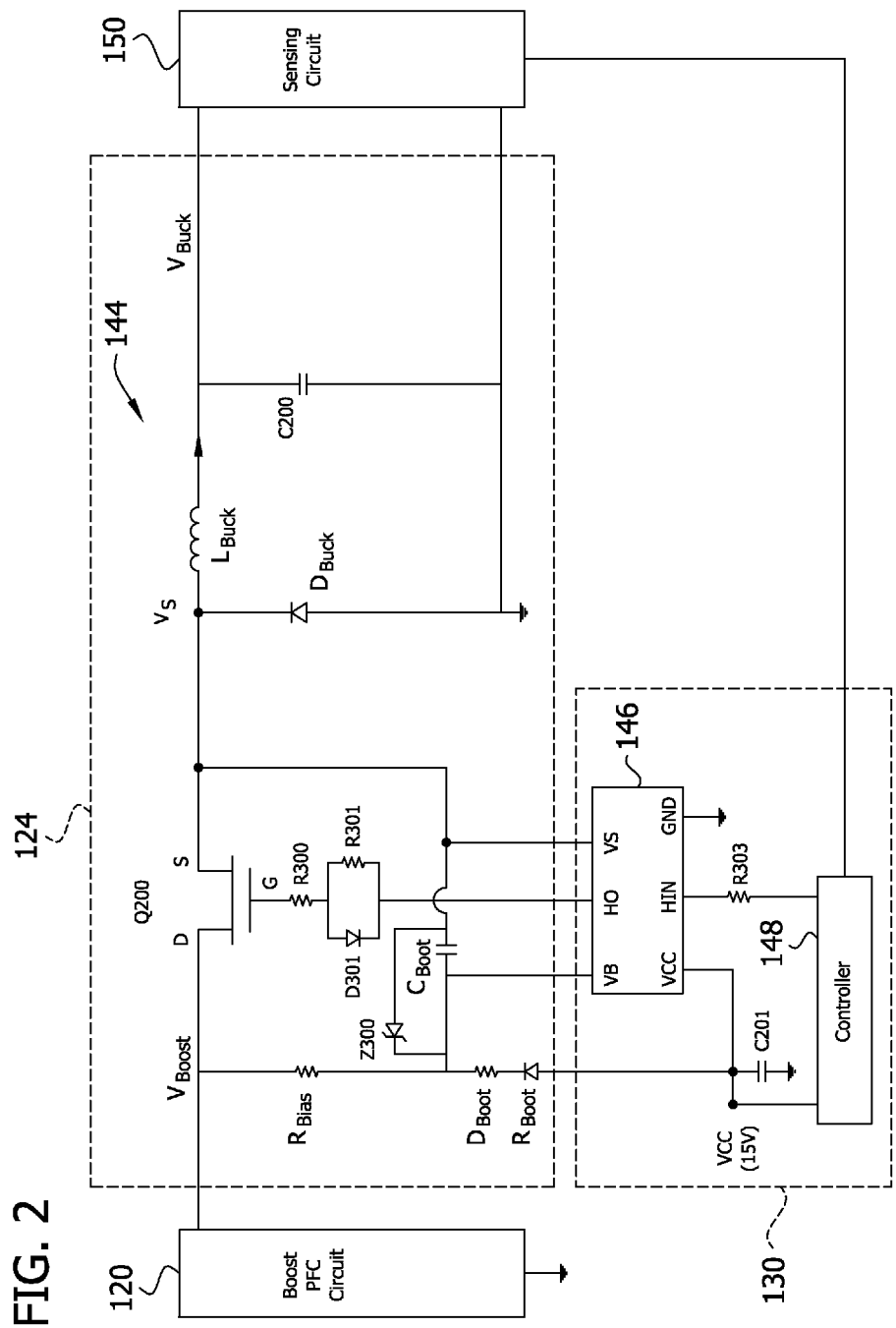
FIG. 2 is a schematic diagram of a buck converter and a control circuit of the lamp system of FIG. 1 according to embodiments disclosed herein.

FIG. 2 is a schematic of an exemplary buck converter 124 and an exemplary control circuit 130. In some embodiments, during the normal operating mode, the buck converter 124 operates as a switched-mode power supply that has a duty cycle that determines the magnitude of the DC voltage signal ($V_{Buck}$) that is produced by the buck converter 124 from the high DC voltage fixed magnitude signal ($V_{Boost}$) received by the buck converter 124. The control circuit 130 drives the buck converter 124 and thus controls the duty cycle. In FIG. 2, the control circuit 130 includes a buck driver 146 (e.g., part FAN7382 High- and Low-Side Gate Driver available from Fairchild Semiconductor) and a controller 148 (e.g., microprocessor). The controller 148 generates a control signal indicative of a switching operation for the buck converter 124, and provides the control signal to the buck driver 146. The buck driver 146, in turn, drives the switching operation of the buck converter 124 according to the control signal.

Referring to FIG. 2, as generally known, the buck converter 124 includes a first switch, a second switch, an inductor, and a capacitor. In accordance therewith, the illustrated buck converter 124 includes a metal-oxide-semiconductor field-effect transistor (buck MOSFET) Q200, a buck diode $D_{BUCK}$, a buck inductor $L_{BUCK}$, and a buck capacitor C200. The buck MOSFET Q200 has a drain terminal, a gate terminal, and a source terminal. A gate drive circuit formed by a resistor R300, a diode 301, and a resistor R301 is connected to the gate terminal of the buck MOSFET Q200 for driving the gate terminal. A bootstrapping circuit (i.e., a bootstrapping capacitor $C_{BOOT}$, a bootstrapping diode $D_{BOOT}$, and a bootstrapping resistor $R_{BOOT}$) is connected between the source terminal of the buck MOSFET Q200 and the power supply $V_{CC}$ for providing a sufficient gate to source voltage for the buck MOSFET Q200. In particular, the bootstrapping diode $D_{BOOT}$ has an anode connected to the power supply $V_{CC}$ and a cathode connected to a first terminal of the bootstrapping resistor $R_{BOOT}$ so that the bootstrapping diode $D_{BOOT}$ and the bootstrapping resistor $R_{BOOT}$ are connected together in series. A second terminal of the bootstrapping resistor $R_{BOOT}$ is connected to a first terminal of the bootstrapping capacitor $C_{BOOT}$, and a second terminal of the bootstrapping capacitor $C_{BOOT}$ is connected to the source terminal of the buck MOSFET Q200. Thus, the bootstrapping capacitor $C_{BOOT}$ is charged from the power supply $V_{CC}$ via the bootstrapping resistor $R_{BOOT}$ and the bootstrapping diode $D_{BOOT}$ when the voltage at a source terminal $V_S$ is less than the power supply voltage $V_{CC}$. In some embodiments, the first terminal of the bootstrapping capacitor $C_{BOOT}$ is also connected to the first terminal of the buck converter 124 via a resistor $R_{BIAS}$ so that the bootstrapping capacitor $C_{BOOT}$ can derive a charging current from $V_{Boost}$. In some embodiments, a zener diode Z300 is connected in parallel with the bootstrapping capacitor $C_{BOOT}$.

During normal operating mode, the MOSFET Q200 and the buck diode $D_{BUCK}$ operate so as to alternately connect and disconnect the buck inductor $L_{BUCK}$ to the boost PFC circuit 120. In other words, buck inductor $L_{BUCK}$ alternately receives the high DC voltage ($V_{Boost}$) from the boost PFC circuit 120 as a function of the buck MOSFET Q200 and the buck diode $D_{BUCK}$. When the buck MOSFET Q200 is conductive (e.g., closed; ON), current flows from the boost PFC circuit 120 through the buck inductor $L_{BUCK}$, the buck capacitor C200, and a shunt resistor (not shown). The high DC voltage ($V_{Boost}$) from the boost PFC circuit 120 reverse-biases the buck diode $D_{BUCK}$, so no current flows through the buck diode $D_{BUCK}$. On the other hand, when the buck MOSFET Q200 is non-conductive (e.g., open; OFF), the buck diode $D_{BUCK}$ is forward biased and thus conducts current. Accordingly, current flows in a path from the buck inductor $L_{BUCK}$ and passing through the buck capacitor $C_{BUCK}$, the shunt resistor (not shown), and the buck diode $D_{BUCK}$. Thus, the buck inductor $L_{BUCK}$ stores energy (e.g., charges) from the boost PFC circuit 120 while the buck MOSFET Q200 is conductive and dissipates energy (e.g., discharges) to the inverter 126 while the buck MOSFET Q200 is non-conductive. The amount of time that the buck MOSFET Q200 is conductive during a period of one conductive and one non-conductive state (i.e., during a period) is the duty cycle for the buck converter 124. When the buck MOSFET Q200 is operating in the non-conductive state, the voltage at the source terminal $V_S$ is close to ground potential, enabling the bootstrapping capacitor $C_{BOOT}$ to charge. The bootstrapping capacitor $C_{BOOT}$ discharges energy for providing a sufficient gate to source voltage for the buck MOSFET Q200 in order to switch the buck MOSFET Q200 from the non-conductive state to the conductive state.

As described above, during the start up operating mode, the switching component operates in a non-conductive state because the voltage at the input terminal of the switching component has not yet reached the breakover voltage. As such, the inverter 126 does not operate as a load on the buck converter 124, so the buck MOSFET Q200 operates in the non-conductive state and current through the inductor $L_{BUCK}$ is low. This results in small inductive kickback so the voltage $V_S$ at the source terminal of the buck MOSFET Q200 is high (i.e., greater than $V_{CC}$). Because the voltage $V_S$ at the source terminal of the buck MOSFET Q200 is high, the bootstrapping capacitor $C_{BOOT}$ is not charged from the power supply $V_{CC}$. Additionally, when current through the resistor $R_{BIAS}$ falls below a threshold value, the bootstrapping capacitor $C_{BOOT}$ does not derive a charging current from $V_{Boost}$.

In order to ensure that the bootstrapping capacitor $C_{BOOT}$ charges and the voltage at the input terminal of the switching component increases to the breakover voltage, embodiments pulse the buck MOSFET Q200 from the non-conductive state to the conductive state ("pulsed ON") during the start up operating mode. In some embodiments, the buck MOSFET Q200 is initially pulsed (e.g., pulsed at a beginning time of the start up operating mode) on to ensure that the buck output voltage $V_{Buck}$ rises to the peak DC buck voltage value and that the bootstrapping capacitor $C_{BOOT}$ charges. Since the inverter 126 is not operating as a load on the buck converter 124, after the initial pulse(s) the bootstrapping capacitor $C_{BOOT}$ dissipates and the buck output voltage $V_{Buck}$ begins to fall (i.e., decrease). Thus, during the start up operating mode, at one or more points in time subsequent to the time of the initial pulse, the buck MOSFET Q200 is again pulsed on so that the buck output voltage $V_{Buck}$ rises back to the peak DC buck voltage value and the bootstrapping capacitor $C_{BOOT}$ recharges. In some embodiments, the time that the buck MOSFET Q200 is pulsed on may be based on the voltage value at the input of the switching circuit 152. For example, in FIGS. 1 and 2, the sensing circuit 150 senses the voltage at the input terminal of the switching circuit 152. The controller 148 monitors this sensed voltage. When the sensed voltage reaches a predetermined value(s) (i.e., less than the breakover voltage), the controller 148 provides a pulse to the gate drive of the buck converter driver 146 so that the buck MOSFET Q200 is pulsed on. Once the voltage at the input terminal of the switching circuit 152 reaches the breakover voltage, the switching circuit 152 conducts a start up signal to the inverter 126 and the inverter 126 begins oscillating and operates as a load to the buck converter 124.

Figure 3:
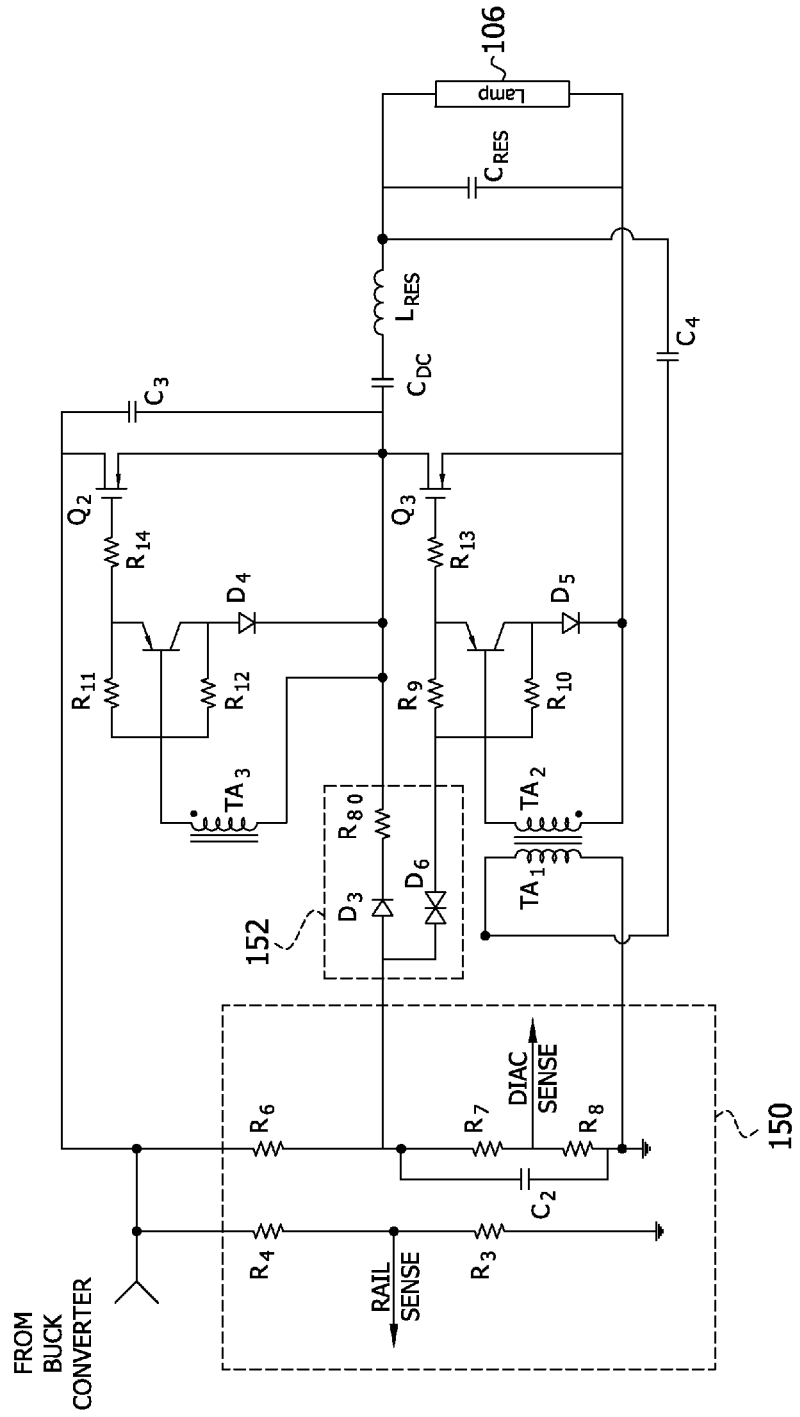
FIG. 3 is a schematic diagram of a sensing circuit, switching circuit, and inverter of the lamp system of FIG. 1 according to embodiments disclosed herein.

FIG. 3 is a schematic of the sensing circuit 150, the switching circuit 152, and the inverter 126. In FIG. 3, the sensing circuit 150 includes resistors R4 and R3 connected in series for sensing the output voltage $V_{Buck}$ of the buck converter 124. The sensing circuit also includes resistors R6, R7, R8, and a capacitor C2 for sensing the voltage at the input terminal of the switching circuit 152. In particular, the resistor R6 is connected to the output terminal of the buck converter 124. The resistors R7 and R8 are connected together in series between the resistor R6 and a ground potential. Together the resistors R6, R7, and R8 form a voltage divider. The capacitor C2 is connected in parallel with the series connected resistors R7 and R8. The capacitor C2 stores energy derived from the output voltage $V_{Buck}$ of the buck converter 124 and thus generates the voltage ($V_A$) at the input terminal of the switching circuit 152. In FIG. 3 as shown, the controller 146 is connected to the sensing circuit 150 at a junction between the resistors R7 and R8. Thus, the sensed voltage provided by the sensing circuit 150 to the controller 146 is the voltage across the resistor R8. The voltage across the resistor R8 is indicative of (e.g., proportional to) the voltage $V_A$ at the input to input terminal of the switching circuit 152. The time required for the voltage $V_A$ at the input terminal of the switching circuit 152 to reach the predetermined breakover voltage is a function of a time constant formed by the network of the capacitor C2 and the resistors R7 and R8.

The switching circuit 152 includes a DIAC (broadly "switching component") D6, a diode D3, and a resistor R80. The combination of one or more of these components may also commonly be referred to as a starting circuit. The DIAC has a predetermined breakover voltage. In some embodiments, the breakover voltage is 32 Volts, or substantially 32 Volts. Responsive to the voltage $V_A$ generated by the capacitor C2 increasing to the breakover voltage, the DIAC D6 conducts current to the inverter 126, thereby providing a startup signal to the inverter 126. Once the inverter 126 begins to oscillate, the DIAC D6 switches to a non-conductive state and current is conducted from the buck converter 124 to the inverter 126 via the diode D3 and the resistor R80.

In FIG. 3, the inverter 126 includes a first switching component Q2 and a second switching component Q3. For example, the first and second switching components, Q2 and Q3, may each comprise a metal-oxide-semiconductor field-effect transistor (MOSFET). As such, the first switching component Q2 and the second switching component Q3 each have a gate terminal, a drain terminal, and a source terminal. A first gate drive circuit comprising a resistor R14, a resistor R4, a resistor R12, and a diode D4 is connected at the gate terminal of the first switching component Q2. A second gate drive circuit comprising a resistor R13, a resistor R9, a resistor R10, and a diode D5 is connected at the gate terminal of the second switching component Q3. The DIAC D6 of the switching circuit 152 is connected to the gate terminal of the second switching component Q3 for initially activating the second switching component Q3. Thus, once the voltage $V_A$ at the input terminal of the switching circuit 152 reaches the breakover voltage, the DIAC D6 conducts a startup signal (e.g., gate pulse) to the second switching component Q3. Once the second switching component Q3 is initially turned on via the startup signal, the first and second switching components, Q2 and Q3, are complementarily commutated via the first and second gate drive circuits. In other words, the first and second switching components, Q2 and Q3, are operated such that when the first switching component Q2 is conductive (e.g., ON), the second switching component Q3 is non-conductive (e.g., OFF). Likewise, when the second switching component Q3 is conductive (e.g., ON), the first switching component Q2 is non-conductive (e.g., OFF). The inverter circuit 124 also includes a resonant circuit comprising an inductor $L_{RES}$ and a capacitor $C_{RES}$ connected together in series. The resonant circuit $L_{RES}$, $C_{RES}$ is connected to the source terminal of the first switching component Q2 via a DC blocking capacitor $C_{DC}$. The resonant circuit $L_{RES}$, $C_{RES}$ provides a high voltage for igniting the lamp 106 and a magnitude-limited current for operating the lamp 106 at a particular current. In some embodiments, a capacitor $C_{ZVS}$ is connected between the drain terminal and the gate terminal of the first switching component Q2 for improving EMI and ensuring zero voltage switching.

Figure 4:
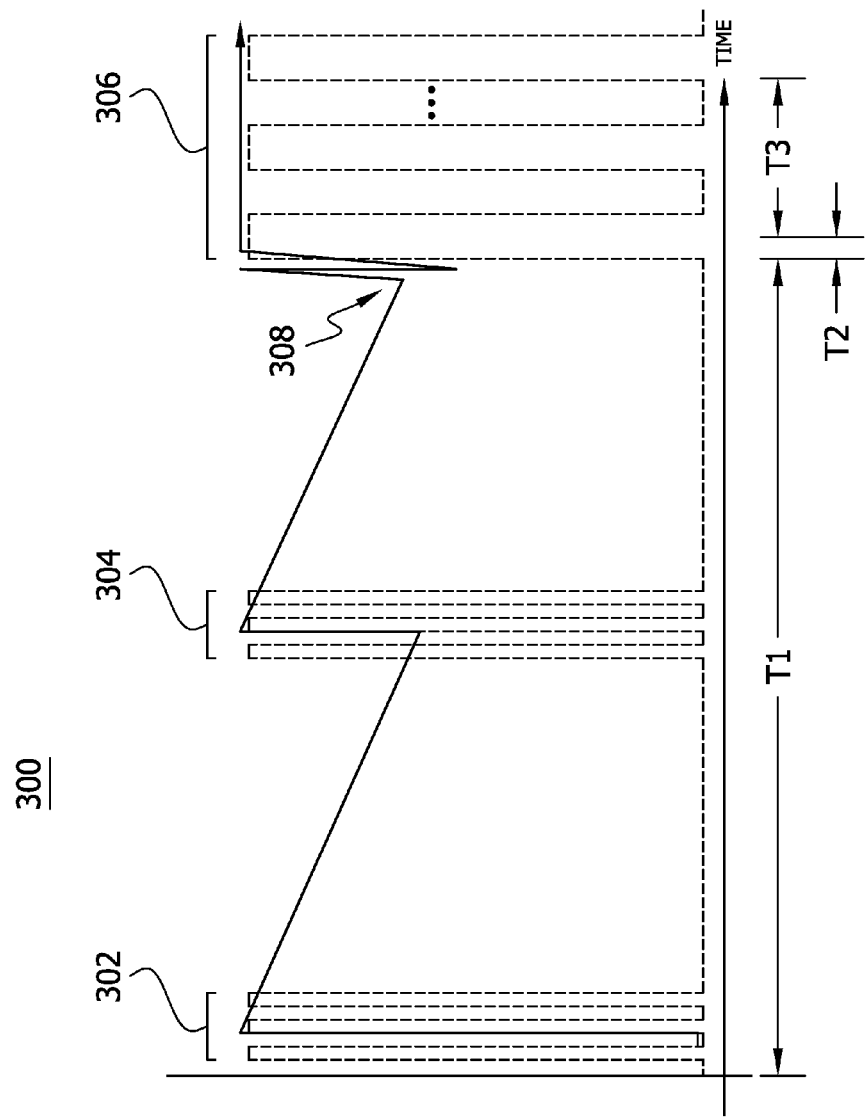
FIG. 4 is a timing diagram of a gate drive signal and of a voltage output signal during the start up mode according to embodiments disclosed herein.

FIG. 4 is a timing diagram 300 generally illustrating the gate drive pulses generated by the control circuit 130 (indicated via the dashed line trace) and the DC voltage $V_{Buck}$ generated by the buck converter 124 (indicated via the solid line trace) during the three operation modes of the ballast 104. In particular, T1 indicates the time period during which the ballast 104 is operating in the startup mode, T2 indicates the time period during which the ballast 104 is operating in the inverter activation mode, and T3 indicates the time period during which the ballast 104 is operating in the normal operating mode. As illustrated, at the beginning of the startup mode, a set of initial gate drive pulses 302 are generated in order to drive the DC voltage $V_{Buck}$ generated by the buck converter 124 to a predetermined peak value. As explained above, after the initial gate drive pulses 302 pump the DC voltage $V_{Buck}$ up to the peak value, the DC voltage $V_{Buck}$ begins to decrease. Another set of gate drive pulses (set of intermediate gate drive pulses) 304 are generated in order to drive the DC voltage $V_{Buck}$ generated by the buck converter 124 back up to the predetermined peak value. Subsequent to the generation of the set of intermediate gate drive pulses (indicated at 308), the voltage at the switching component reaches the predetermined breakover voltage.

As such, the ballast 104 begins operating in the inverter activation mode, indicated at T2. During the inverter activation mode, the switching component conducts the start up signal to the inverter 126. The inverter 126 then begins oscillating and the ballast 104 operates in the normal operating mode, indicated at T3. During the normal operating mode, the control circuit 130 provides gate drive pulses 306 having a particular duty cycle for driving the buck converter 124 to generate a target DC voltage $V_{Buck}$ which converted by the inverter 126 to an oscillating signal and supplied to the lamp 106.

Figure 5:
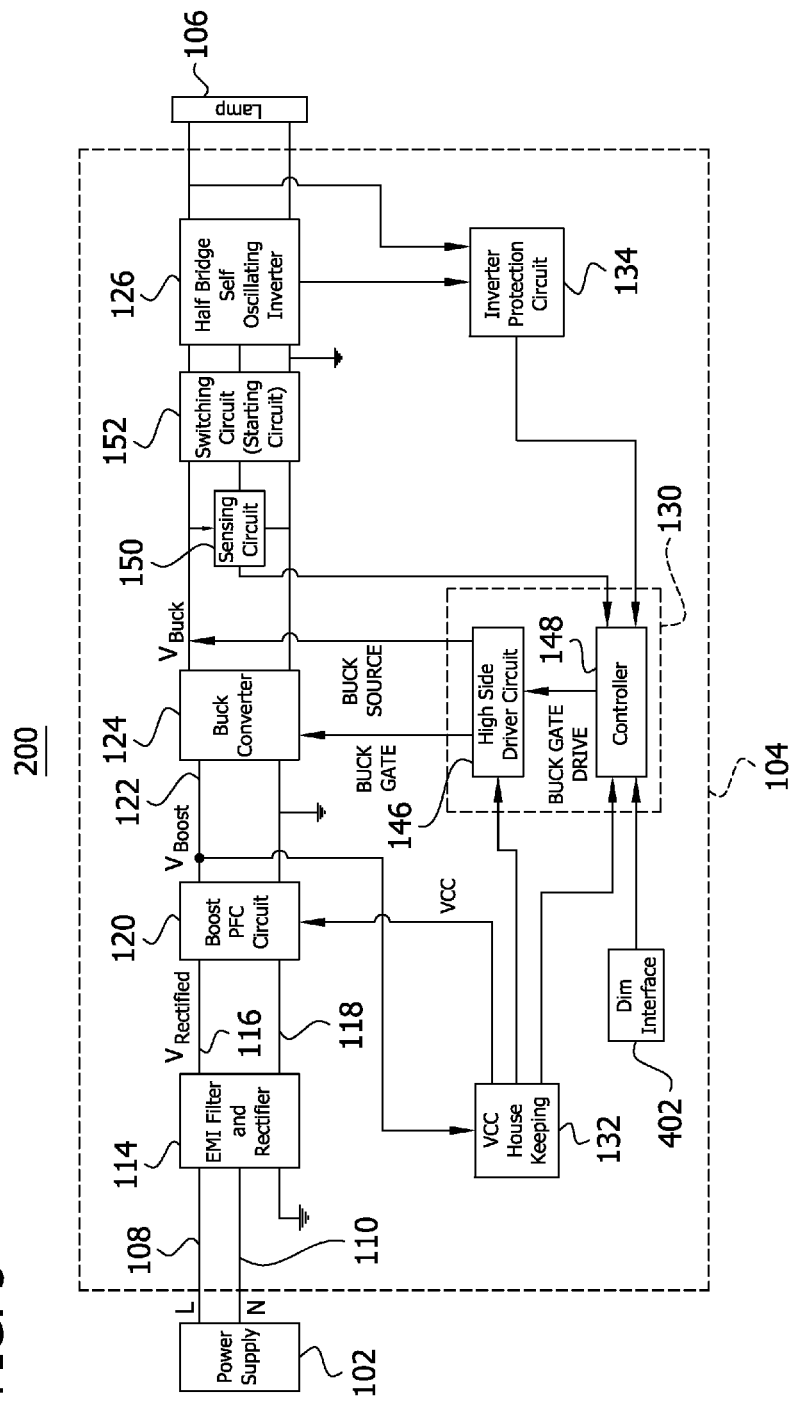
FIG. 5 is a block diagram of a lamp system according to embodiments disclosed herein.

FIG. 5 is a block diagram illustrating a lamp system 200. In addition to the components discussed above in connection with the lamp system 100 shown in FIG. 1, the lamp system 200 includes a dim interface 402 (e.g., step dim interface, continuous dim interface) connected to the control circuit 130. The dim interface 402 receives an input indicative of a selected lighting level of a plurality of lighting levels. The dim interface 402 provides a dim signal indicative of the selected lighting level to the control circuit 130. The control circuit 130 drives the buck converter circuit 124 so that the DC voltage $V_{Buck}$ generated by the buck converter 124, once being converted to an oscillating voltage signal by the inverter 126, will energize the lamp 106 at the selected lighting level. In particular, the control circuit 130 determines a duty cycle (e.g., on switching time and off switching time) for the buck converter 124 that will step down the high DC voltage fixed magnitude signal ($V_{Boost}$) to generate a DC voltage signal ($V_{Buck}$) having a magnitude for energizing the lamp 106 at the selected lamp lighting level. The control circuit 130 provides a control signal (BUCK_PWM_IN) to the buck converter 124 indicating the determined duty cycle. In response to receiving the control signal (BUCK_PWM_IN) from the control circuit 130, the buck converter 124 adjusts the duty cycle to the determined duty cycle in order to produce the DC voltage signal ($V_{Buck}$) having a magnitude for energizing the lamp 106 at the selected lamp lighting level.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A ballast comprising:
    a rectifier that receives an alternating current (AC) voltage signal from an AC power supply and produces a rectified voltage signal therefrom;
    a power factor correction circuit connected to the rectifier to provide a corrected voltage signal as a function of the rectified voltage signal;
    a buck converter connected to the power factor correction circuit to step down the corrected voltage signal, the buck converter comprising:
        an input terminal connected to the power factor correction circuit to receive the corrected voltage signal;
        an output terminal to provide the stepped down voltage signal;
        a transistor having a drain terminal, a gate terminal, and a source terminal, wherein the drain terminal is connected to the input terminal;
        a capacitor having a first terminal connected to the output terminal and having a second terminal connected to ground potential;
        a diode having an anode connected to ground potential and having a cathode connected to the source terminal of the transistor; and
        an inductor having a first terminal connected to the source terminal of the transistor and to the cathode of the diode, and having a second terminal connected to the first terminal of the capacitor;
    an inverter connected to the output terminal of the buck converter circuit to receive a start up signal and, in response, to generate an oscillating voltage signal to energize the lamp;
    a switching component connected between the output terminal of the buck converter circuit and the inverter to provide the start up signal to the inverter, the switching component having a predetermined breakover voltage value, wherein the switching component is configured to provide the start up signal to the inverter when a voltage at the switching component increases to the predetermined breakover voltage value;
    a sensing circuit configured to sense the voltage at the switching component; and
    a control circuit connected to the buck converter and to the sensing circuit to drive the buck converter, the control circuit configured to monitor the sensed voltage from the sensing circuit while the voltage at the switching component increases to the predetermined breakover voltage and to generate a gate drive pulse at the gate terminal of the transistor when the sensed voltage reaches a predetermined voltage that is less than the breakover voltage of the switching component.

2. The ballast of claim 1, wherein the buck converter further comprises:
    a bootstrapping capacitor connected to the source terminal of the transistor, wherein the bootstrapping capacitor is charged in response to the gate drive pulse generated at the gate terminal of the transistor when the sensed voltage reaches the predetermine voltage.

3. The ballast of claim 2, wherein the buck converter further comprises:
    a bootstrapping resistor and a bootstrapping diode connected together in series, wherein a first terminal of the bootstrapping capacitor is connected to the series connected bootstrapping resistor and bootstrapping diode, and a second terminal of the bootstrapping capacitor is connected to the source terminal of the transistor.

4. The ballast of claim 3, further comprising:
    an internal power supply; and
    wherein the bootstrapping diode has an anode connected to the internal power supply and a cathode connected to the bootstrapping resistor.

5. The ballast of claim 1, wherein the buck converter further comprises:
    a bias resistor; and
    a bootstrapping capacitor;
    wherein the bias resistor has a first terminal connected to the input terminal of the buck converter and a second terminal connected to a first terminal of the bootstrapping capacitor, and wherein a second terminal of the bootstrapping capacitor is connected to the source terminal of the transistor.

6. The ballast of claim 1, wherein the switching component is a diode for alternating current (DIAC).

7. The ballast of claim 1, wherein the predetermined breakover voltage is about 32 Volts.

8. The ballast of claim 1, wherein the sensing circuit comprises:
- a first sensing resistor and a second sensing resistor connected together in series; and
- a sensing capacitor;
- wherein the series connected first and second sensing resistors is connected between the switching component and the ground potential, and wherein the sensing capacitor is connected in parallel with the series connected first and second sensing resistors.

9. The ballast of claim 8, wherein the first and second sensing resistor and the sensing capacitor define a time constant, and wherein the voltage at the switching component increases to the breakover voltage over a period of time, and the period of time is a function of the time constant.

10. The ballast of claim 8, wherein the second sensing resistor has a first terminal connected to the first sensing resistor and a second terminal connected to ground potential, and wherein the control circuit is connected to the sensing circuit at the first terminal of the second sensing resistor, and the sensed voltage is the voltage across the second resistor.

11. A ballast comprising:
- a buck converter to generate a direct current (DC) buck voltage output, the buck converter having a particular peak DC buck voltage value associated therewith;
- an inverter connected to buck converter circuit to receive a start up signal and, in response, to generate an oscillating voltage signal to energize a lamp;
- a switching component connected between the buck converter and the inverter to provide the start up signal to the inverter, the switching component having a predetermined breakover voltage value, wherein the switching component is configured to provide the start up signal to the inverter when voltage at the switching component increases to the predetermined breakover voltage value;
- a sensing circuit configured to sense the voltage at the switching component; and
- a control circuit connected to the buck converter and the sensing circuit to drive the buck converter, the control circuit configured to monitor the sensed voltage from the sensing circuit while the voltage at the switching component increases to the predetermined breakover voltage and to drive the buck converter to generate a voltage pulse having the particular peak DC buck voltage value when the sensed voltage reaches a predetermined voltage that is less than the breakover voltage of the switching component.

12. The ballast of claim 11, wherein the buck converter comprises:
- a bootstrapping capacitor configured to charge responsive to the voltage pulse generated by the buck converter when the sensed voltage reaches the predetermined voltage.

13. The ballast of claim 11, wherein the sensing circuit comprises:
- a first sensing resistor and a second sensing resistor connected together in series; and
- a sensing capacitor;
- wherein the series connected first and second sensing resistors is connected between the switching component and ground potential, and wherein the sensing capacitor is connected in parallel with the series connected first and second sensing resistors.

14. The ballast of claim 13, wherein the first and second sensing resistor and the sensing capacitor define a time constant, and wherein the voltage at the switching component increases to the breakover voltage over a period of time, and the period of time is a function of the time constant.

15. The ballast of claim 13, wherein the second sensing resistor has a first terminal connected to the first sensing resistor and a second terminal connected to ground potential, and wherein the control circuit is connected to the sensing circuit at the first terminal of the second sensing resistor, and the sensed voltage is the voltage across the second resistor.

16. The ballast of claim 11, wherein the control circuit is configured to drive the buck converter in a normal operation mode subsequent to the voltage at the switching component increasing to the predetermined breakover voltage value, wherein during the normal operation mode, the control circuit drives the buck converter to operate at a particular duty cycle.

17. The ballast of claim 16, wherein the particular duty cycle corresponds to a selected lighting level for the lamp.

18. The ballast of claim 16, wherein the control circuit is further configured to vary the particular duty cycle in order to vary a lighting level generated by the lamp.

19. A ballast comprising:
- a rectifier to receive an alternating current (AC) voltage signal from an AC power supply and to produce a rectified voltage signal therefrom;
- a power factor correction circuit connected to the rectifier to provide a corrected voltage signal as a function of the rectified voltage signal;
- a buck converter to generate a direct current (DC) buck voltage output as a function of the corrected voltage signal, the buck converter having a particular peak DC buck voltage value associated therewith;
- an inverter connected to the buck converter to receive a start up signal and, in response, to generate an oscillating voltage signal to energize a lamp;
- a switching component connected between the buck converter and the inverter to provide the start up signal to the inverter, the switching component having a predetermined breakover voltage value, wherein the switching component is configured to provide the start up signal to the inverter when voltage at the switch component increases to the predetermined breakover voltage value;
- a sensing circuit configured to sense the voltage at the switching component; and
- a control circuit connected to the buck converter and the sensing circuit to drive the buck converter, the control circuit configured to monitor the sensed voltage from the sensing circuit while the voltage at the switching component increases to the predetermined breakover voltage and to drive the buck converter to generate a voltage pulse having the particular peak DC buck voltage value when the sensed voltage reaches a predetermined voltage that is less than the breakover voltage of the switching component.

20. The ballast of claim 19, wherein the buck converter comprises:
- a bootstrapping capacitor configured to charge responsive to the voltage pulse generated by the buck converter when the sensed voltage reaches the predetermined voltage.

* * * * *